United States Patent
Frincu et al.

(10) Patent No.: US 10,212,141 B2
(45) Date of Patent: Feb. 19, 2019

(54) AUTONOMOUS KEY UPDATE MECHANISM WITH BLACKLISTING OF COMPROMISED NODES FOR MESH NETWORKS

(71) Applicant: FREESCALE SEMICONDUCTOR, INC., Austin, TX (US)

(72) Inventors: Andrei Catalin Frincu, Pascani (RO); George Bogdan Alexandru, Bucharest (RO)

(73) Assignee: NXP USA, Inc., Austin, TX (US)

( * ) Notice: Subject to any disclaimer, the term of this patent is extended or adjusted under 35 U.S.C. 154(b) by 171 days.

(21) Appl. No.: 15/297,332

(22) Filed: Oct. 19, 2016

(65) Prior Publication Data
US 2017/0324716 A1 Nov. 9, 2017

(30) Foreign Application Priority Data
May 4, 2016 (RO) .............................. A2016-00314

(51) Int. Cl.
*H04L 29/06* (2006.01)
(52) U.S. Cl.
CPC .......... *H04L 63/061* (2013.01); *H04L 63/101* (2013.01); *H04L 63/126* (2013.01)
(58) Field of Classification Search
CPC ............. G06F 21/6218; G06F 21/6245; H04L 9/0861; H04L 9/0631; H04L 63/0421; H04L 63/0435
USPC ........................................................ 713/171
See application file for complete search history.

(56) References Cited

U.S. PATENT DOCUMENTS

| | | | |
|---|---|---|---|
| 7,665,126 B2 | 2/2010 | Simon et al. |
| 8,087,085 B2 | 12/2011 | Hu et al. |
| 8,959,333 B2 | 2/2015 | Falk et al. |
| 2008/0178294 A1 | 7/2008 | Hu et al. |
| 2009/0307483 A1 | 12/2009 | Falk et al. |

(Continued)

FOREIGN PATENT DOCUMENTS

CN 101977384 A 2/2011

OTHER PUBLICATIONS

Bansal, Divya et al; "Threshold based Authorization model for Authentication of a node in Wireless Mesh Networks"; Int. J. of Advanced Networking and Applications, vol. 01, Issue 06; pp. 387-392 (2010).

(Continued)

*Primary Examiner* — Mohammed Waliullah

(57) ABSTRACT

Various embodiments described herein relate to network key manager which is configured to manage keys in nodes in the network, wherein the network key manager including a memory configured to store an update data structure; a processor configured to: determine which nodes are blacklisted; generate the update data structure of volatile private keys for each node that is not blacklisted, wherein the volatile private key is based upon secret information associated with the node and an index, wherein the volatile private key is used for the index$^{th}$ key update; determine a neighbor node of the network key manager; remove the volatile private key for the neighbor node from the update data structure; encrypt the resulting update data structure and a new network key with the private key for the neighbor node to produce an encrypted message; and send the encrypted message to the neighbor node.

19 Claims, 5 Drawing Sheets

(56) References Cited

U.S. PATENT DOCUMENTS

| | | | | |
|---|---|---|---|---|
| 2010/0329463 | A1* | 12/2010 | Ratliff | H04L 9/0833 380/279 |
| 2012/0324218 | A1* | 12/2012 | Duren | H04L 9/0825 713/158 |
| 2013/0259230 | A1 | 10/2013 | Polo et al. | |

OTHER PUBLICATIONS

Shamir, Adi; "How to Share a Secret"; Communications of the ACM, vol. 22, No. 11; 2 pages (Nov. 1979).

* cited by examiner

AUTONOMOUS KEY UPDATE MECHANISM WITH BLACKLISTING OF COMPROMISED NODES FOR MESH NETWORKS

CROSS-REFERENCE TO RELATED APPLICATIONS

This application claims the priority under 35 U.S.C. § 119 of Romania patent application no. A201600314, filed May 4, 2016 the contents of which are incorporated by reference herein.

TECHNICAL FIELD

Various embodiments disclosed herein relate generally to network security.

BACKGROUND

Key distribution in networking has many different types of networks and cryptographic systems to account for. In public key cryptography, both a public and private key pair are distributed with the private key being specific to the intended recipient. The private key may be used for decryption, while the public key may be used for encryption of data. Symmetric key encryption schemes are different in the sense that they use the same key on both sides of the communication at the recipient as well as at the sender's end. Similarly, the same key is used for both encryption as well as decryption in symmetric key algorithms.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a network key manager which is configured to manage keys in nodes in the network, wherein the network key manager including a memory configured to store an update data structure; a processor configured to: determine which nodes are blacklisted; generate the update data structure of volatile private keys for each node that is not blacklisted, wherein the volatile private key is based upon secret information associated with the node and an index, wherein the volatile private key is used for the $index^{th}$ key update; determine a neighbor node of the network key manager; remove the volatile private key for the neighbor node from the update data structure; encrypt the resulting update data structure and a new network key with the private key for the neighbor node to produce an encrypted message; and send the encrypted message to the neighbor node.

Various embodiments described herein relate to a network node which is configured to receive a network key update, including a memory configured to store a secret information associated with the network node; a processor configured to: receive an encrypted message including an update data structure and a new network key from a network key manager; generate a decryption key based upon the secret information and a current index; decrypt the encrypted message with the decryption key; determine a neighbor node of the network node; remove the volatile private key for the neighbor node from the update data structure; encrypt the resulting update data structure and the new network key with the private key for the neighbor node to produce an encrypted neighbor message; and send the encrypted neighbor message to the neighbor node.

Various embodiments described herein relate to a method of managing keys in nodes in a network by a network key manager, the method including: determining which nodes are blacklisted; generating an update data structure of volatile private keys for each node that is not blacklisted, wherein the volatile private key is based upon secret information associated with the node and an index, wherein the volatile private key is used for the $index^{th}$ key update; determining a neighbor node of the network key manager; removing the volatile private key for the neighbor node from the update data structure; encrypting the resulting update data structure and a new network key with the private key for the neighbor node to produce an encrypted message; and sending the encrypted message to the neighbor node.

BRIEF DESCRIPTION OF THE DRAWINGS

In order to better understand various embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

A known challenge in mesh networks, where communication is secured with a shared network key, or symmetric key encryption, concerns the efficient distribution of a new network key once some nodes are considered compromised. Since each node already knows the current network key and each node is considered identical (from a security stand point) to any other node, a trivial approach cannot be used. Usually, the network has a security manager which provides the network key to any new node that enrolls in the mesh and triggers the key update when necessary. Manually updating each node is impractical, so a method that allows the network to autonomously react in the process of updating the key and blacklisting the compromised nodes would be beneficial. It would be useful to reduce the number of packets that are needed to be exchanged for security updates.

Embodiments described herein include methods to allow a mesh network to autonomously handle a key update procedure, which may be useful when a mesh node is determined to be compromised. Some embodiments may include a provisioning stage where a manager or a coordinator device, may share the current network key, along with specific confidential information to each node that enrolls in the mesh or the network. At this stage the manager may add the address-secret pair to a private database abbreviated ASPD. In another embodiment, during a key update stage, based on the information from the ASPD, the Manager may build a private table (known as $T_M$), which is then autonomously propagated throughout the mesh together with the new network key.

Figure 1:
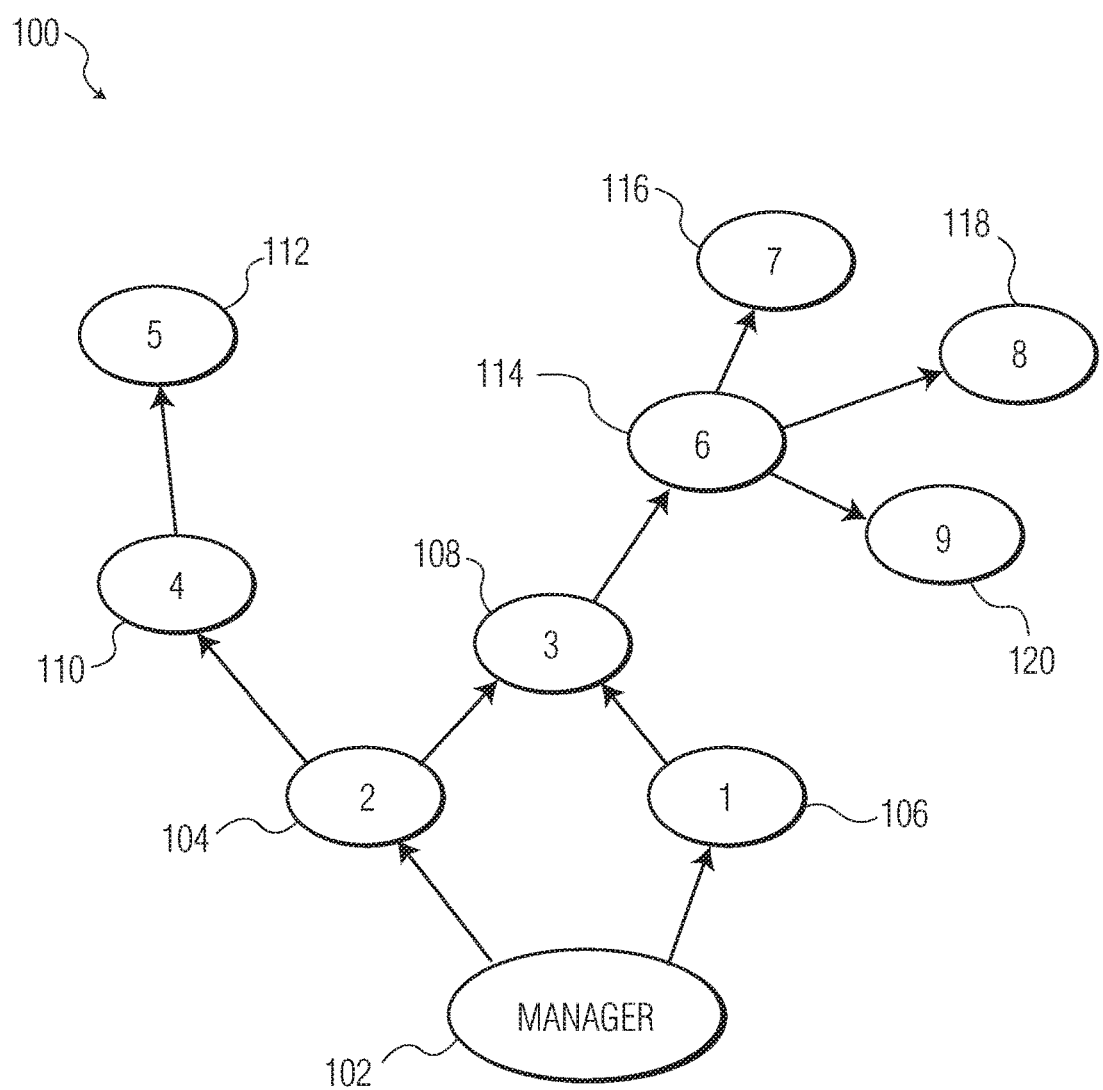
FIG. 1 illustrates an system network diagram.

FIG. 1 illustrates a system network diagram 100. System network diagram 100 may include manager 102 and nodes 104-120. The connections in system network diagram 100 may be any kind of telecommunications network topology such as a mesh network, ring, star, fully connected, line, or tree. Similarly, the technologies used for the network may be any kind of wired or wireless technologies such as, Local Area Network (LAN), Asynchronous Transfer Mode (ATM), Wireless LAN (WiFi), Internet Protocol (IP), and Long Term Evolution (LTE), for example.

Manager 102 may be a server, computer, personal computer, data center, blade, tablet device, or personal phone, for example. Nodes 102-120 may similarly be any of a server, computer, personal computer, data center, blade, tablet device, or personal phone. In one example, manager 102 may be a server blade in a data center. In this example, each of nodes 102-120 may be servers in data centers located in different cities. In another example, all of nodes 102-120 and manager 102 may be located in the same center, such as a university, while each node may reflect a different server for that university.

Manager 102 may manage and distribute a key system such as a private key infrastructure. Manager 102 may store a table and/or data structure to identify current and past keys as well as nodes which are assigned to those keys. This may be applied for a public as well as a private key infrastructure. The data structures may be a tree, a binary tree, a hash, an array, a class or a database, for example.

Provisioning

In some embodiments, a provisioning stage may take place where the manager 102 may create and update an index to keep track of progressive versions of secret keys, for example as when certain nodes get blacklisted. In the provisioning stage a node K may be added to the mesh network. The manager 102 may send a current network key, NK and private information, $m_K$ needed by both the manager and node K in the key update stage. The private information $m_K$ may be used at the $index^{th}$ key update to generate a volatile secret. For node K, this volatile secret may be denominated $P_k^{index}$.

The private information $m_K$ for each node 104-120 may be stored by the Manager in ASPD, while each node 104-120 stores it on its own memory device.

In one embodiment, the generated private key be a cryptographic hash over the private information $m_K$ and the index as such:

$$P_k^{index} = \text{Hash}(m_K | \text{index}).$$

The cryptographic hash may be any known hash function. Also, other one-way functions may be used to generate the private key using the private information $m_K$ and the index.

Prior to the key update stage, the manager M may build a private key table $T_M$, including $P_K$ private keys, corresponding to each node K.

In one example, two nodes from nodes 104-120 may communicate by encrypting their payloads with the network key NK. An encryption function may take as inputs the NK and a message. This may be diagrammed as such from a network node X to a network node Y:

E(NK, Message[X,Y]); where E is any encryption function, taking as inputs the network key NK and a message being communicated between nodes X and Y.

Similarly, a message may be encrypted from Node Y to X as such:

E(NK, Message [Y,X])

A new node Z may be provisioned by sending the NK, $m_Z$, and the current index over a secure channel from manager 102. At the same time or concurrently to when this information may be sent to node Z, the manager may add it to the secret key table ASPD or any other similar data structure. When node Z receives this information, it may store the NK, $m_Z$, and the current index in its own memory.

Figure 2:
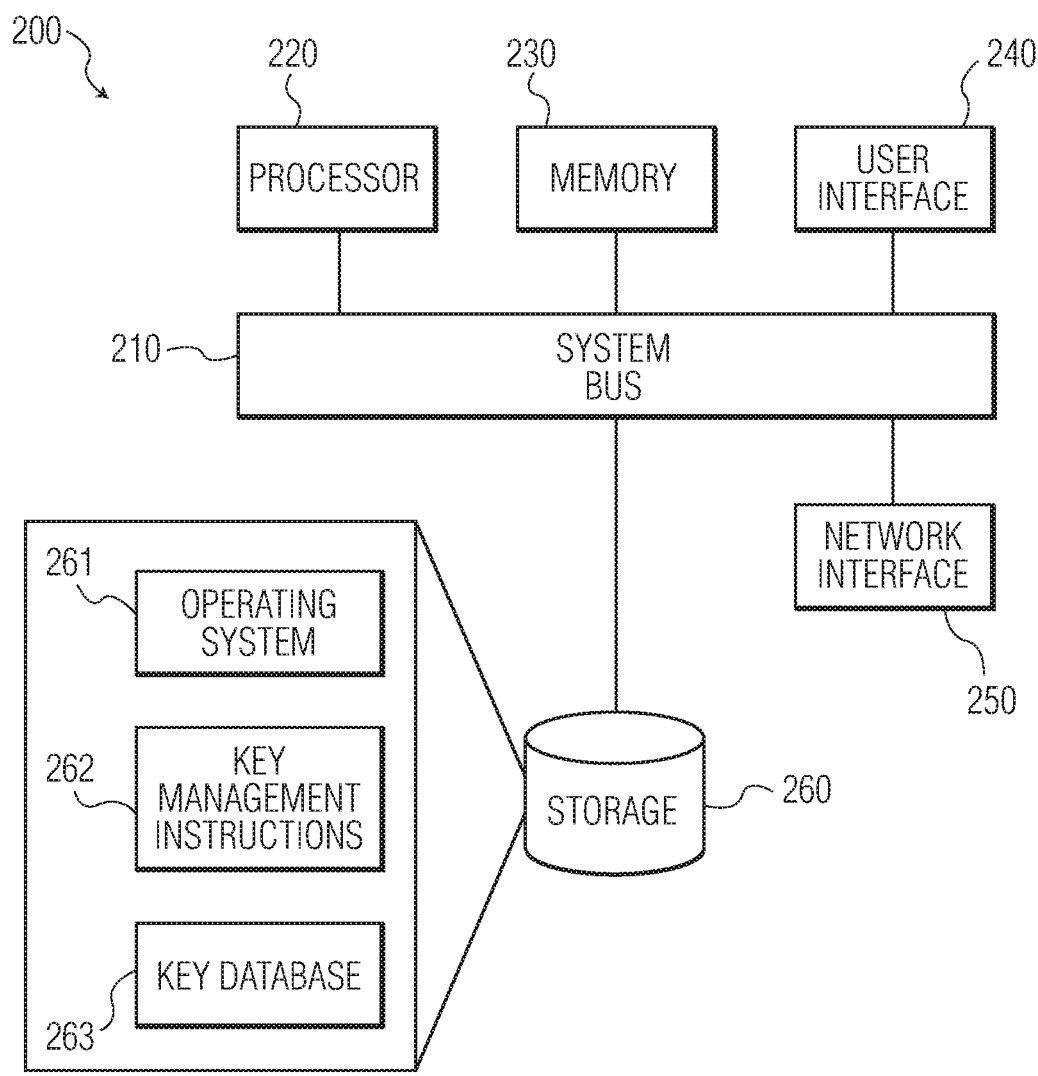
FIG. 2 illustrates an system diagram.

FIG. 2 illustrates a hardware diagram 200 for implementing a manager or a node. The hardware 200 may correspond to one or more nodes 104-120 or manager 102 of FIG. 1. As shown, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, field programmable gate array (FPGA), application-specific integrated circuit (ASIC), or other similar devices.

The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices.

The user interface 240 may include one or more devices for enabling communication with a user such as an administrator. For example, the user interface 240 may include a display, a mouse, and a keyboard for receiving user commands. In some embodiments, the user interface 240 may include a command line interface or graphical user interface that may be presented to a remote terminal via the network interface 250.

The network interface 250 may include one or more devices for enabling communication with other hardware devices. For example, the network interface 250 may include a network interface card (NIC) configured to communicate according to the Ethernet protocol. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200. The storage 260 may store key management instructions 262 for managing the public or private key storage, distribution and updating. The storage 260 may store a key database 263 such as one of the data structures previously mentioned.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

Figure 3:
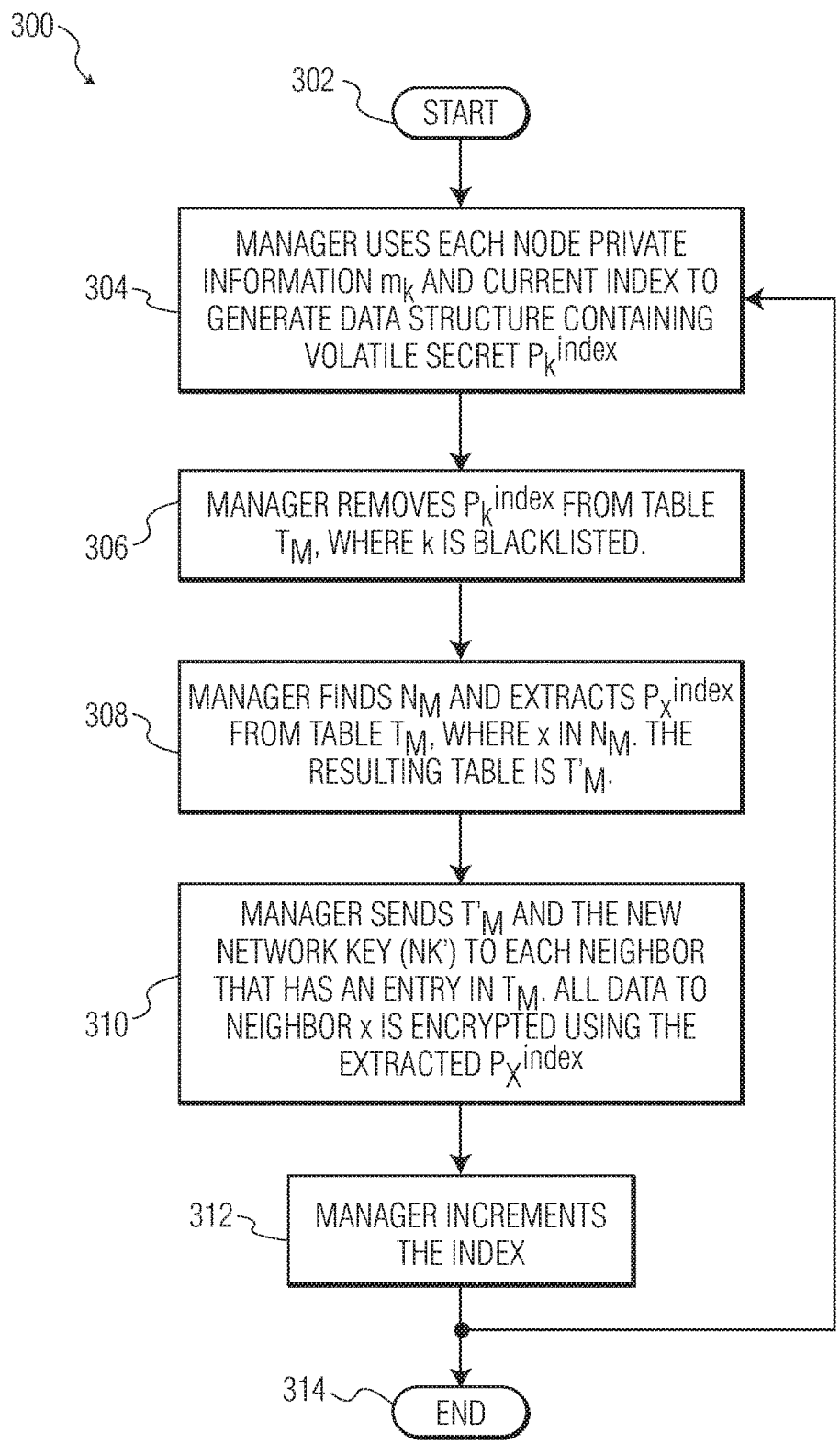
FIG. 3 illustrates an method of key updating by a manager.

FIG. 3 illustrates an method of key updating by a manager 300. In embodiments of the method of key updating, the manager is intended to eliminate a set of blacklisted nodes without having to manually update the key to each node, in such a manner that none of the blacklisted nodes can obtain the renewed key.

The method may begin in step 302 where manager 102 may proceed to step 304. In step 304, the manager may use each nodes (K) private information $m_K$ and the current index to generate a data structure ($T_M$) containing the volatile secret $P_k^{idex}$ for each node in the network. Manager 102 may then proceed to step 306.

In step 306 manager 102 may remove $P_k^{idex}$ from table $T_M$, for a node K which is determined to be blacklisted. Manager 102 may then proceed to step 308. Alternatively, as part of step 304, the manager 102 may, instead, not generate $P_k^{index}$ for the black listed nodes.

In step 308 manager 102 may find $N_M$ where:
$N_M$={X, where X is direct neighbor of M}; for example:
$N_2$={M,1,4,5}; $N_3$={11,9};

Manager 102 may extract $P_X^{index}$ from table $T_M$ where X is in $N_M$ creating the table $T'_M$. This removes the $P_k^{index}$ values for the neighbors of the manager 102 from the table $T_M$. Manager 102 may then move on to step 310.

In step 310 manager 102 may send $T'_M$ and a new network key (NK') to each neighbor which has an entry in $T_M$. Data which is sent to each neighbor X is encrypted using $P_X^{index}$ extracted in step 308. Manager 102 may then proceed to step 312.

In step 312, manager 102 may then increment the index and proceed back to step 304 or to step 314 to cease operations.

Figure 4:
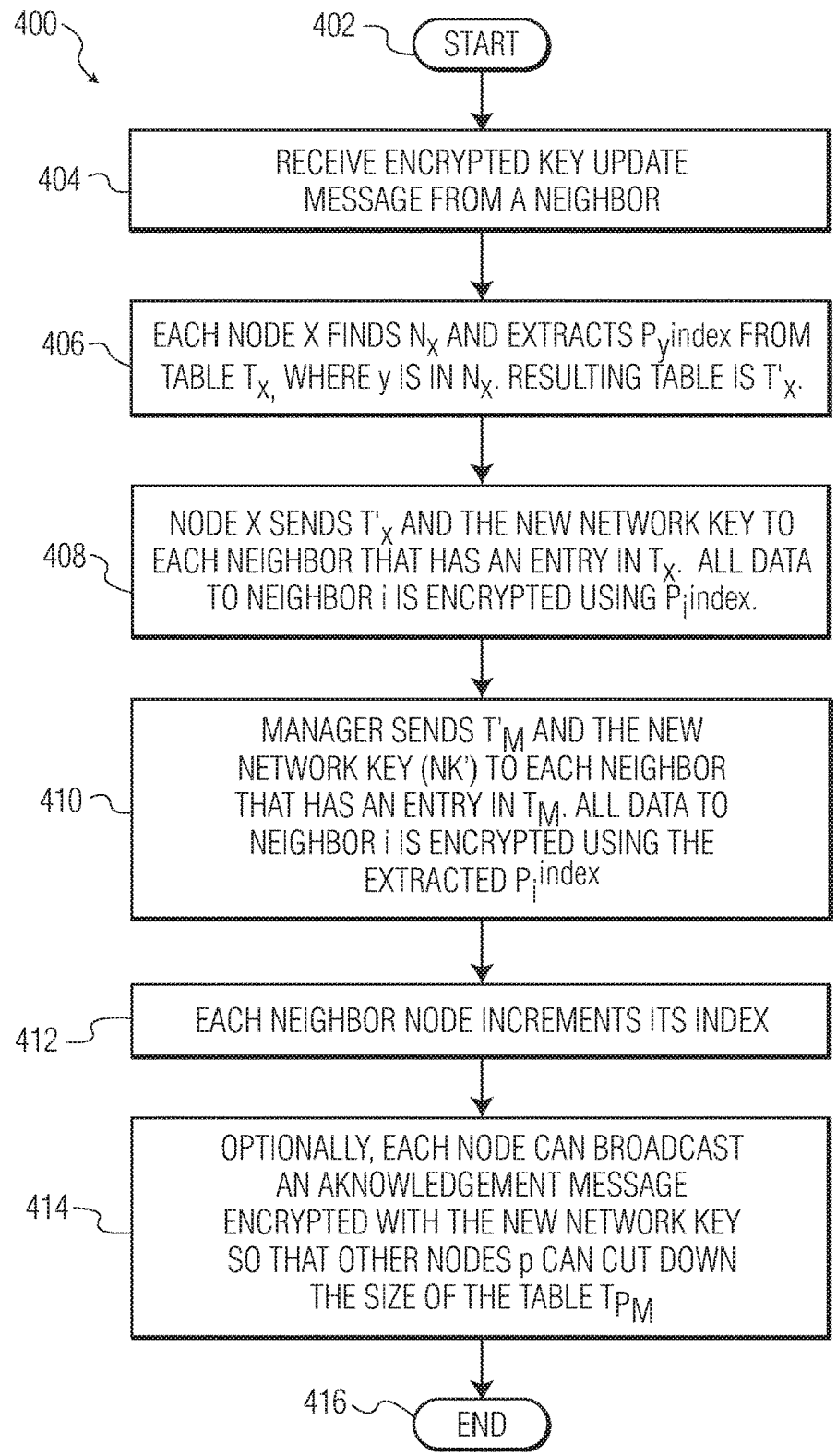
FIG. 4 illustrates an method of updating keys by a node.

FIG. 4 illustrates an method 400 of updating keys by a node. The method of updating keys 400 may be performed by any of nodes 104-120. The node may start in step 402 and proceed to step 404. In step, 404 the node n receives an encrypted key update message from a neighbor.

In step 406, the node n may calculate $P_n^{index}$ based upon the current index value and the private information in and then may use $P_n^{index}$ to decrypt the encrypted key update message received from its neighbor. The encrypted key update message may include the new key NK' and the table $T'_M$ (where $T'_M$ is as described above). The node n extracts the new key NK' from the decrypted key update message and stores the decrypted $T'_M$, which becomes $T_n$. The node may then proceed to step 408.

In step 408, the node n may find $N_n$ where:
$N_n$={X, where X is direct neighbor of n}; for example:
$N_2$={M,1,4,5}; $N_3$={11,9}.
The neighbor information $N_n$ may be stored in the node n and may be maintained using various known methods. The node n then may remove/extract $P_x^{index}$ for all neighbors x from table $T_n$ received from the key update message, where x is in $N_n$. The resulting table is $T'_n$. The node may then proceed to step 410.

In step 410, the node n may send $T'_n$ and the new network key (NK') to each neighbor i that has an entry in $T_n$. All data to neighbor i may be encrypted using the extracted $P_i^{index}$. Hence, the encrypted message to each node may only be decrypted by that node. The node may then proceed to step 412.

In step 412, each node n may increment its index. The node may then proceed to step 414.

In step 414, each node may also broadcast an acknowledgement message encrypted with the new network key NK', such that other nodes p may cut down the size of the table $T_p$. The node may then proceed to step 416 where it may stop.

Figure 5:
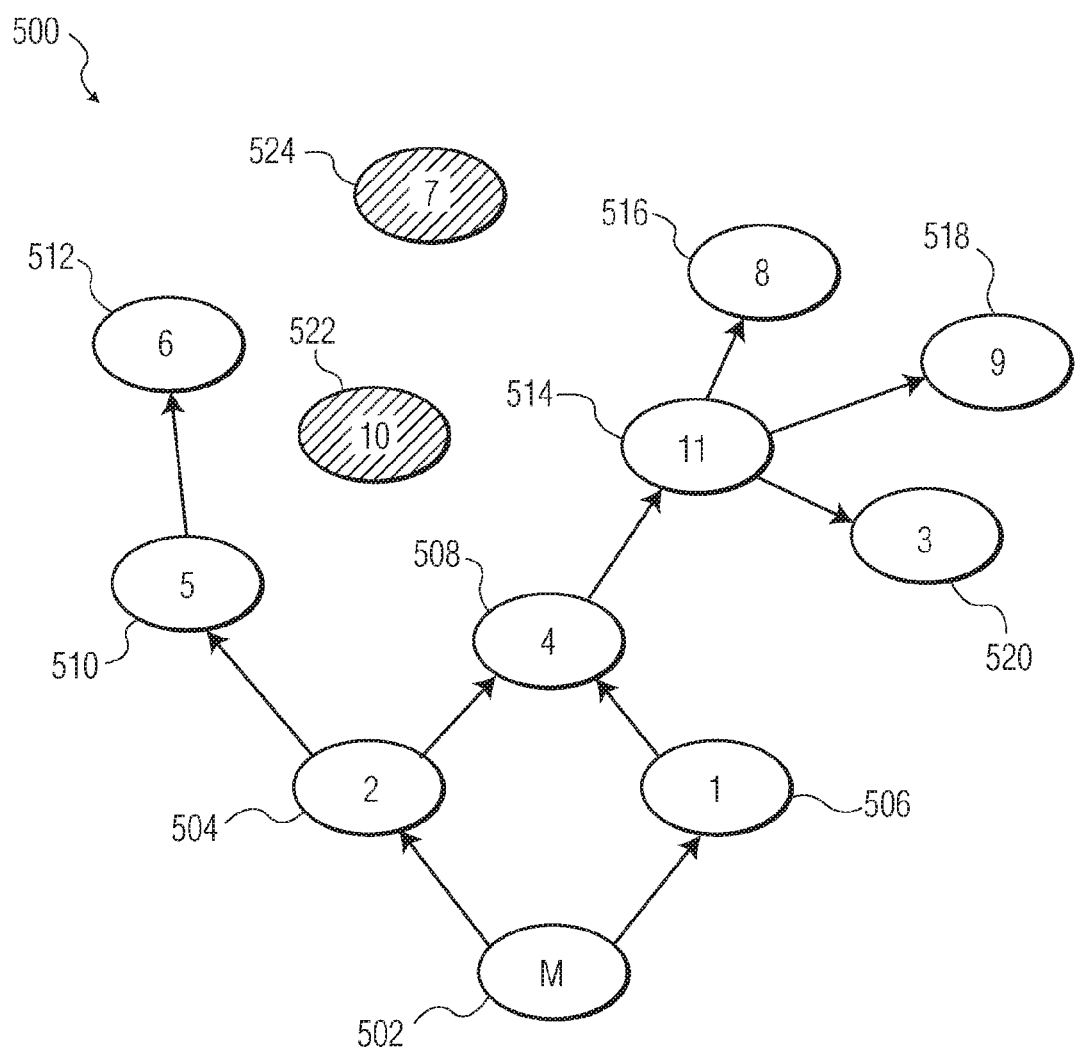
FIG. 5 illustrates an embodiment of key updating.

FIG. 5 illustrates an embodiment of key updating 500. Embodiment 500 may include Manager 502, nodes 504-520 and blacklisted nodes 522-524.

In embodiment 500, manager 502 may maintain initial $T_M$ table:
$T_M$={$P_1^{index}$, $P_2^{index}$, $P_3^{index}$, $P_4^{index}$, $P_5^{index}$, $P_6^{index}$, $P_7^{index}$, $P_8^{index}$, $P_9^{index}$, $P_{10}^{index}$, $P_{11}^{index}$}.
The manager 502 may produce an updated $T'_M$ table that may be sent to update the network:
$T'_M$={$P_3^{index}$, $P_4^{index}$, $P_5^{index}$, $P_6^{index}$, $P_7^{index}$, $P_8^{index}$, $P_9^{index}$, $P_{10}^{index}$, $P_{11}^{index}$}.

Manager 502 may send to node 504 an encrypted message including table $T'_M$, and new network key NK' that is encrypted by private key $P_2^{index}$ as follows:
$E(P_2^{index}, T'_M|NK')$.

Node 504 may then produce its own volatile secret data structure table from the received table $T'_M$ by removing the neighboring nodes of node 504. This table may look as such:
$T'_2$={$P_3^{index}$, $P_6^{index}$, $P_8^{index}$, $P_9^{index}$, $P_{11}^{index}$}.

Node 504 may then encrypt and send the encrypted message to node 510, where the message is encrypted as follows:
$E(P_5^{index}, T'_2|NK')$.

At the same time, node 506 may produce its own data structure table as described above as follows:
$T'_1$={$P_3^{index}$, $P_5^{index}$, $P_6^{index}$, $P_8^{index}$, $P_9^{index}$, $P_{11}^{index}$}.

Node 506 may then encrypt and send the encrypted message to node 508, where the message is encrypted as follows:
$E(P_4^{index}, T'_1|NK')$ The process continues in successive nodes, until the new network key NK' has propagated to each of the network nodes in the network.

In one example, as it relates to collisions, node 508 may receive two network key update packets from node 506 and 504. Assuming, for example, node 504 sends the message first, node 508 may receive the information, increment the index and propagate the new table. When node 506 sends the key update packet using the information in its volatile secret data structure $T_{506}$ table by encrypting the payload with $P_{508}^{index}$, node 508 decrypts the packet from node 506. Since the decryption will fail, the packet will be dropped.

In another example, related to blacklisting, for node 512 nodes 524 and 522 may be considered neighbors. The private table $T_{512}$, however, may not contain any information neither for 524 nor for 522 so these nodes may therefore not receive the new network key.

In yet another example, related to acknowledgments, the upper protocol may implement any acknowledgement scheme to account for:

Sleepy nodes that may not receive the updates when the procedure is triggered.

Isolated nodes or subnetworks linked by blacklisted nodes.

It should be apparent from the foregoing description that various embodiments of the invention may be implemented in hardware. Furthermore, various embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

The invention claimed is:

1. A network key manager which is configured to manage keys in nodes in the network, wherein the network key manager comprises:

a memory configured to store an update data structure;

a processor configured to:

determine which nodes are blacklisted;

generate the update data structure of volatile private keys for each node that is not blacklisted, wherein the volatile private key is based upon secret information associated with the node and an index, wherein the volatile private key is used for the indexth key update;

determine a neighbor node of the network key manager;

remove the volatile private key for the neighbor node from the update data structure;

encrypt the resulting update data structure and a new network key with the private key for the neighbor node to produce an encrypted message; and send the encrypted message to the neighbor node.

2. The network key manager according to claim 1, wherein the processor is further configured to:

provision a new network node including:

generating secret information for the new network node;

sending the secret information, a current index, and a current network key to the new network node; and storing the secret information for the new network node in the memory.

3. The network key manager according to claim 1, wherein generating the update data structure of volatile private keys for each node that is not blacklisted includes generating the volatile private key by running a cryptographic hash on the secret information associated with the node and the index.

4. The network key manager according to claim 1, wherein the processor is further configured to increment the index.

5. The network key manager according to claim 1, wherein the secret information for the nodes is stored in a secret information data structure.

6. A network node which is configured to receive a network key update, comprising:

a memory configured to store a secret information associated with the network node;

a processor configured to:

receive an encrypted message including an update data structure and a new network key from a network key manager;

generate a decryption key based upon the secret information and a current index;

decrypt the encrypted message with the decryption key;

determine a neighbor node of the network node;

remove the volatile private key for the neighbor node from the update data structure;

encrypt the resulting update data structure and the new network key with the private key for the neighbor node to produce an encrypted neighbor message; and send the encrypted neighbor message to the neighbor node.

7. The network node according to claim 6, wherein the processor is further configured to receive a provisioning message including the secret information, a current index, and current network key.

8. The network node according to claim 6, wherein the processor is further configured to increment the index.

9. The network node according to claim 6, wherein the processor is if further configured to:

encrypt an acknowledgment message using the new network key identifying the network node; and broadcast the encrypted acknowledgment message to the network.

10. The network node according to claim 6, wherein the processor is if further configured to:

receive an encrypted acknowledgment message key identifying the network node;

decrypt the encrypted acknowledgement message using the new network key; and remove the volatile private key for the identified node from the update data structure.

11. A method of managing keys in nodes in a network by a network key manager, the method comprising:
determining which nodes are blacklisted;
generating an update data structure of volatile private keys for each node that is not blacklisted, wherein the volatile private key is based upon secret information associated with the node and an index, wherein the volatile private key is used for the indexth key update;
determining a neighbor node of the network key manager;
removing the volatile private key for the neighbor node from the update data structure;
encrypting the resulting update data structure and a new network key with the private key for the neighbor node to produce an encrypted message; and
sending the encrypted message to the neighbor node.

12. The method claim 11, wherein the further method comprises:
provisioning a new network node including:
generating secret information for the new network node;
sending the secret information, a current index, and a current network key to the new network node; and
storing the secret information for the new network node in the memory.

13. The method claim 11,
wherein generating the update data structure of volatile private keys for each node that is not blacklisted includes generating the volatile private key by running a cryptographic hash on the secret information associated with the node and the index.

14. The method claim 11,
wherein the further method comprises incrementing the index.

15. The method claim 11,
wherein the secret information for the nodes is stored in a secret information data structure.

16. A method of updating a network key in a network node, comprising:
receiving an encrypted message including an update data structure and a new network key from a network key manager;
generating a decryption key based upon a secret information associated with the network node and a current index;
decrypting the encrypted message with the decryption key;
determining a neighbor node of the network node;
removing the volatile private key for the neighbor node from the update data structure;
encrypting the resulting update data structure and the new network key with the private key for the neighbor node to produce an encrypted neighbor message; and
sending the encrypted neighbor message to the neighbor node.

17. The method according to claim 16,
wherein the processor is further configured to receive a provisioning message including the secret information, a current index, and current network key.

18. The method according to claim 16, further comprising incrementing the index.

19. The method according to claim 16, further comprising:
encrypting an acknowledgment message using the new network key identifying the network node; and
broadcasting the encrypted acknowledgment message to the network.

* * * * *